United States Patent
Bayer et al.

(10) Patent No.: US 8,917,008 B2
(45) Date of Patent: Dec. 23, 2014

(54) ELECTRIC MACHINE, IN PARTICULAR COMMUTATOR MACHINE

(75) Inventors: Michael Bayer, Ludwigsburg (DE); Sven Hartmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 633 days.

(21) Appl. No.: 12/991,810

(22) PCT Filed: May 7, 2009

(86) PCT No.: PCT/EP2009/055522
§ 371 (c)(1),
(2), (4) Date: Jan. 26, 2011

(87) PCT Pub. No.: WO2009/135897
PCT Pub. Date: Nov. 12, 2009

(65) Prior Publication Data
US 2011/0109192 A1    May 12, 2011

(30) Foreign Application Priority Data

May 9, 2008   (DE) .......................... 10 2008 001 702

(51) Int. Cl.
*H02K 13/00*   (2006.01)
*H01R 39/22*   (2006.01)
*H01R 43/12*   (2006.01)
*H02K 13/10*   (2006.01)

(52) U.S. Cl.
CPC ................ *H01R 43/12* (2013.01); *H01R 39/22* (2013.01); *H02K 13/10* (2013.01)
USPC ............ 310/253; 310/228; 310/252; 310/245

(58) Field of Classification Search
CPC ....................................................... H02K 13/00
USPC .................. 310/230, 239–252, 253, 228, 148
See application file for complete search history.

(56) References Cited

U.S. PATENT DOCUMENTS

| | | | | |
|---|---|---|---|---|
| 5,387,831 A | * | 2/1995 | Yang | 310/242 |
| 5,701,046 A | * | 12/1997 | Kammerer et al. | 310/251 |
| 6,898,839 B2 | * | 5/2005 | Katoh et al. | 29/597 |

(Continued)

FOREIGN PATENT DOCUMENTS

| | | | | |
|---|---|---|---|---|
| DE | 4446607 A1 | * | 6/1996 | H02K 13/00 |
| GB | 2352881 A | | 2/2001 | |

(Continued)

OTHER PUBLICATIONS

DE 4446607 A1 machine translation Dec. 31, 2012.*

*Primary Examiner* — Tran Nguyen
*Assistant Examiner* — Leda Pham
(74) *Attorney, Agent, or Firm* — Michael Best & Friedrich LLP

(57) ABSTRACT

The invention relates to an electric machine, in particular a commutator machine (10), the carbon brushes (14) of which cooperate with a commutator (13) to supply the rotor with current, the carbon brushes (14) being continuously provided or provided in layer sections with different additives such as scouring material, lubricants or similar. To achieve a longer service life for the carbon brushes (14), a maximum of half, preferably less than half of all the carbon brushes (14) of the machine have a significant fraction of an additive, said fraction differing from that of the other carbon brushes (14).

16 Claims, 2 Drawing Sheets

(56) References Cited

U.S. PATENT DOCUMENTS

| | | | |
|---|---|---|---|
| 6,909,219 B2* | 6/2005 | Takahashi et al. | 310/251 |
| 7,498,712 B2* | 3/2009 | Hockaday et al. | 310/252 |
| 2004/0000836 A1* | 1/2004 | Okubo et al. | 310/252 |
| 2005/0212376 A1* | 9/2005 | Niimi et al. | 310/251 |

FOREIGN PATENT DOCUMENTS

| | | |
|---|---|---|
| JP | 45-28196 | 10/1970 |
| JP | 56158677 | 11/1981 |
| JP | 5837775 | 3/1983 |
| JP | 58168868 | 10/1983 |
| JP | 58-168868 | 11/1983 |
| JP | 60-99869 | 7/1985 |
| JP | 62016042 | 1/1987 |
| JP | 63302744 | 12/1988 |
| JP | 1198245 | 8/1989 |
| JP | 4111180 | 4/1992 |
| JP | 4-111180 | 9/1992 |
| JP | 6099869 | 4/1994 |
| JP | 6-60274 | 8/1994 |
| JP | 8237911 | 9/1996 |
| JP | 2006288168 | 10/2006 |
| JP | 2007097244 | 4/2007 |
| WO | 2008026826 A1 | 3/2008 |

* cited by examiner

ELECTRIC MACHINE, IN PARTICULAR COMMUTATOR MACHINE

BACKGROUND OF THE INVENTION

The invention relates to an electrical machine, in particular to a commutator machine of the generic type.

Mechanically commutating commutator machines are widely used in motor vehicles. For example, high-power direct-current motors are used to start internal combustion engines in vehicles. The current is in this case passed via one or more brush pairs to a commutator, and from there to the armature winding of the machine. In this case, the so-called carbon brushes are generally composed of a sintered material, which mainly contains copper and graphite components. These carbon brushes and the commutator are subject to wear during operation. In this case, starters are typically designed for short-term operation with 30 000 to 60 000 switching cycles.

In order to save fuel, starters have recently been increasingly required for higher loads and for longer running times, for example for start-stop operation of the internal combustion engine. In this case, it is important that the lubrication and cleaning on the running surface of the commutator are optimally matched, in order to ensure a long carbon brush life. Because of the long running times of the brushes, the worn-away brush material as well as the excess sliding film on the commutator must be removed again. In order to clean the surface of the commutator well, various substances are mixed into the carbon brushes, which ensure that the surface of the commutator has a coating which, as far as possible, remains clean, while at the same time also providing lubrication.

For this purpose, the carbon brushes have a specific proportion of cleaning agents added to them, in a known manner. This ensures a certain amount of constant cleaning of the surfaces, but associated with a certain amount of wear of the carbon brushes, which increases correspondingly as the proportion of cleaning agents rises. A homogeneous distribution of the cleaning agent in all the carbon brushes in the machine results in the cleaning agent acting uniformly on all the carbon brushes, with the same carbon-brush contact pressure.

In order to ensure that the carbon brushes have a correspondingly longer life when there are a greater number of switching cycles, the wear behavior of the carbon brushes must be optimized by matching the lubrication and cleaning of the commutator as well as possible. In this case, it is known for the carbon brushes to be provided with at least two layer sections which extend over the height and width of the carbon brushes as far as their running surface. In order to improve the current commutation, one layer section is in this case provided with a higher proportion of graphite, and another layer section, as a power layer for carrying current, is provided with a higher proportion of copper. Furthermore, it has already been proposed for the carbon brushes to have a cleaning agent section in at least one of the abovementioned layer sections, whose cleaning agent proportion is higher than in the other layer section of the carbon brushes. Since, in this case as well, all the carbon brushes in the direct-current motor are of the same design, this also results in the effect of the various additives accumulating. The various parameters, such as wear, lubrication, commutation and the like, can therefore be adjusted relatively coarsely.

The aim of the present solution is to adjust one or more of the above-mentioned parameters on the carbon brushes considerably more accurately.

SUMMARY OF THE INVENTION

The machine according to the invention and having the characterizing features of claim 1 has the advantage that the additive is no longer distributed uniformly in all the carbon brushes for a parameter which acts on the entire commutator, such as lubrication or cleaning, but is concentrated in only one carbon brush, or in only a small number of carbon brushes in the machine. This makes it possible to first of all provide all the other carbon brushes with the same concentration of additive for coarse adjustment of the corresponding parameter, and to significantly increase or reduce the concentration in one carbon brush, for fine adjustment of the parameter. Since various additives can be finely metered independently of one another in the carbon brushes in a corresponding manner, this results in the further advantage of uniform wear on all the carbon brushes, and a considerable increase in the number of switching cycles for a starter motor.

For example, optimization of the fine matching in order to adjust one carbon brush parameter can be achieved by the proportion of the additive in the at least one carbon brush being relatively at least 10 percent higher than in the other carbon brushes. Furthermore, the different proportion of the additive is expediently introduced only in a layer section of the carbon brush, in which case all the carbon brushes in the machine have two or more layers. In this case, the layer section advantageously extends over the height and width of the carbon brush as far as its running surface. In this case, the additive is predominantly a cleaning agent for cleaning the commutator surface.

Since the contact pressure produced by the brush springs on the commutator decreases as the wear of the carbon brushes increases, it is advantageous in one refinement of the invention that the proportion of the additive changes from the running surface of the carbon brush toward the connecting braid, preferably as the cleaning agent proportion increases. In one development of the invention, it is also expedient that at least one of the carbon brushes in the machine is provided with a proportion of a further additive which differs significantly from the other carbon brushes. In this case, the further additive is expediently a lubricant. Furthermore, for optimized parameter adjustment, it is advantageous if one or some of the carbon brushes has or have a higher proportion of one additive, preferably of a cleaning agent, and another or others of the carbon brushes has or have a higher proportion of the second additive, preferably a lubricant. However, as an alternative to this, it is likewise possible, when using carbon brushes having a plurality of layer sections in the circumferential direction of the commutator, for one additive to be introduced into one of the layer sections, and the other additive to be introduced into another layer section.

BRIEF DESCRIPTION OF THE DRAWINGS

Details of the invention will be explained in more detail in the following text, by way of example, with reference to the figures, in which.

DETAILED DESCRIPTION

Figure 1:
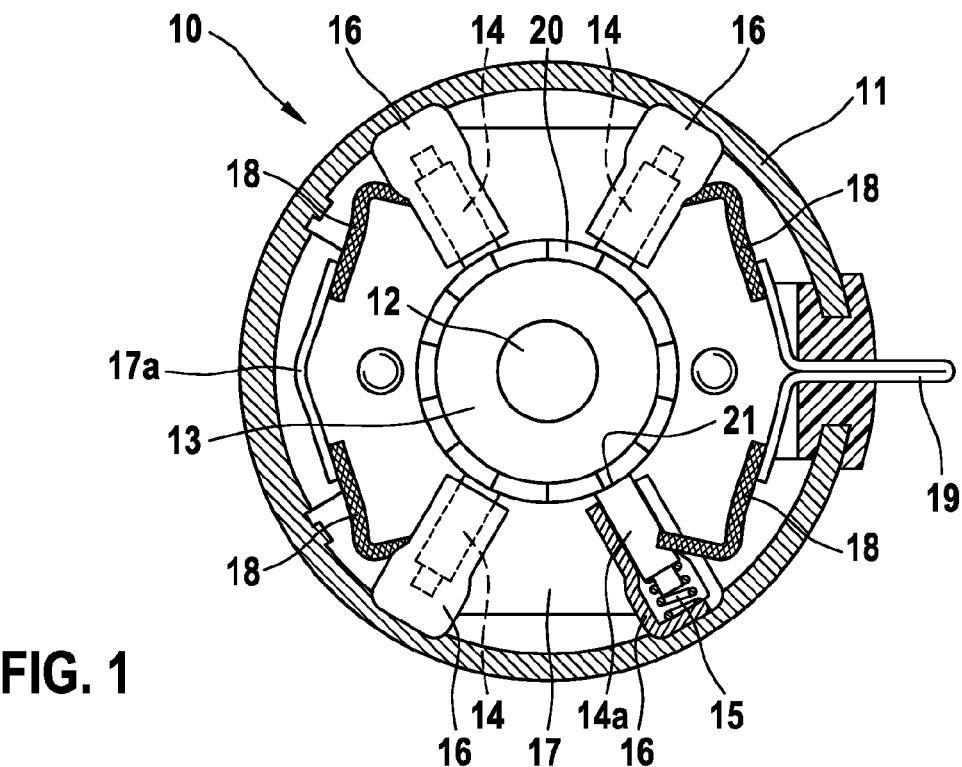
FIG. 1 shows a cross section through a commutator motor in the commutator area.

In FIG. 1, a starter motor is annotated 10, and is illustrated in the form of a cross section through a commutator machine at the commutator end. The starter motor 10 is used for starting internal combustion engines in motor vehicles, which, for example, are equipped with a start-stop system. It has a pole housing 11, which, on its internal circumference, has six permanent-magnetic poles, which cannot be seen but which interact with a rotor, which is not illustrated. At the rear end, the rotor is fitted on its rotor shaft 12 with a commutator 13 for supplying current to the rotor windings. For this purpose, the commutator 13 is provided on its circumference with laminates 20 which interact with four carbon brushes 14. The carbon brushes 14 are each held by a brush spring 15 in a brush holder 16 such that they can move axially, with their running surfaces 21 pressed against the commutator. The four brush holders are held on a brush plate 17, which is itself attached at the end to the rear end of the starter motor 10, and is connected to ground via the pole housing 11. The carbon brushes 14 are each provided with a connecting braid 18 on their rear section. The carbon brushes 14 form two positive and two negative carbon brushes. The two positive carbon brushes 14 make contact with a positive terminal 19 via their connecting braids 18, and the negative carbon brushes are welded via their connecting braids 18 to a sheet-metal strip 17a on the brush plate 17, and are therefore connected to ground.

Figure 2A:
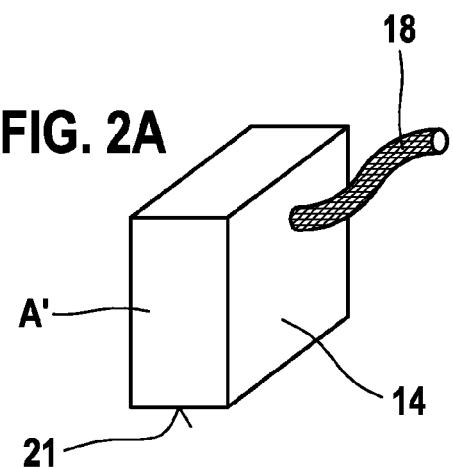
FIGS. 2a and 2b show a carbon brush with additive and one without additive.

In the first exemplary embodiment, as shown in FIG. 1, three of the four carbon brushes 14 have the same material composition all the way through them. They consist of a sintered material, which contains mainly copper and graphite components. In this case, copper is used for better electrical conductivity, and graphite is used for better commutation on the commutator laminates 20. One of these three brushes is illustrated in FIG. 2a. In addition, the brush material also contains a small concentration of further additives, such as a cleaning agent and lubricants. The material composition of the three carbon brushes 14 is annotated A' in FIG. 2a. The lubricants in the carbon brushes 14 in this case form a sliding film on the surface of the commutator 13, reducing the mechanical wear of the carbon brushes 14. Nevertheless, the commutator surface is increasingly contaminated by the brush material that has been worn away, unless it is cleaned continuously or at intervals. However, a greater proportion of cleaning agents in all the carbon brushes 14 would also increase the brush wear, and would therefore reduce the life of the carbon brushes 14.

Figure 2B:
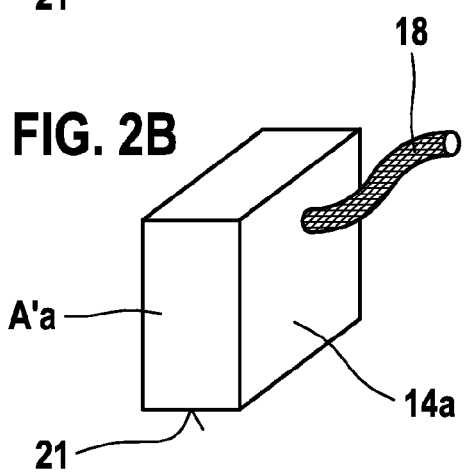

In order to ensure that all the carbon brushes 14 have the same long life, the cleaning behavior is now optimized such that the cleaning effect is deliberately finely adjusted on the fourth carbon brush 14a by increasing the proportion of cleaning agent here relatively by at least 10 percent in comparison to the other carbon brushes 14. FIG. 2b illustrates the carbon brush 14a with the different material composition A'a. While the proportion of the cleaning agent in the material A' of the three carbon brushes shown in FIG. 2a is about 0.5%, it is significantly increased to 0.7% in the material A'a of the fourth carbon brush 14a shown in FIG. 2b.

Figure 3A:
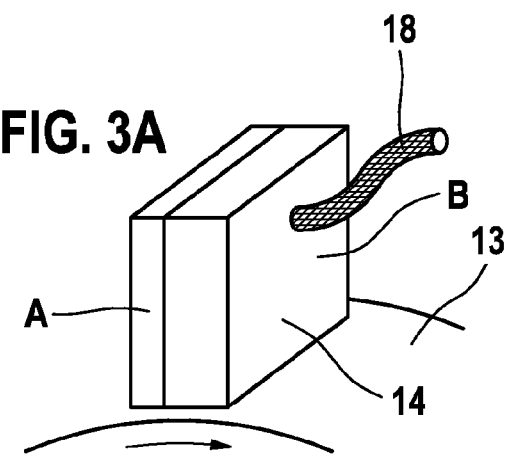
FIGS. 3a and 3b show a carbon brush with two layer sections, with and without additives.
Figure 3B:
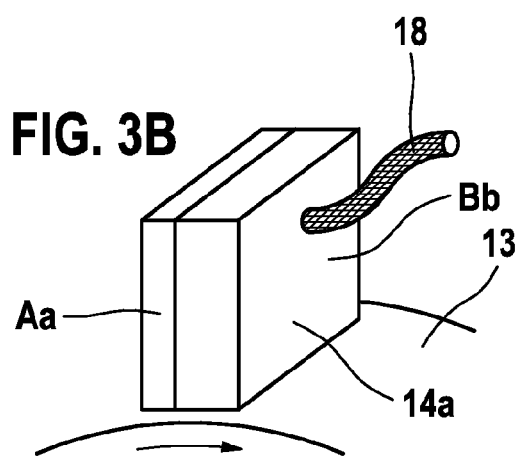

In a second exemplary embodiment, shown in FIGS. 3a and 3b, the carbon brushes 14 are subdivided in a known manner into two layer sections A and B in the circumferential direction of the commutator 13. The leading first layer section A is in this case provided with an increased proportion of copper in order to carry current better, and the second, trailing layer section B contains a greater proportion of graphite, for optimum commutation. The material in the layer section A is also provided with a small proportion of a cleaning agent, and the material in the layer section B is provided with a small proportion of a lubricant.

In order to optimally adjust the wear behavior on the one hand and the cleaning behavior on the other hand on the carbon brushes 14 independently of one another, the fourth carbon brush 14a is changed, shown in FIG. 3b, such that the proportion of cleaning agent is considerably increased in its first layer section Aa in comparison to the other carbon brushes 14, and such that the proportion of lubricant is considerably increased in comparison to the other carbon brushes 14 in the second layer section Bb. Therefore, in this solution, the first layer section contains a first additive, and the second layer section contains a second additive, in a considerably higher concentration than in the other carbon brushes 14.

Figure 4:
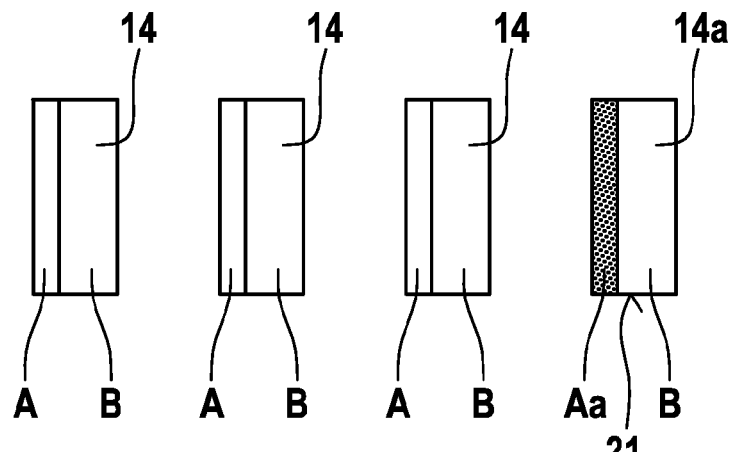
FIG. 4 shows the four carbon brushes in a motor with an additive in one layer section of one carbon brush.

FIG. 4 likewise shows a third exemplary embodiment, with four carbon brushes 14, each having two layer sections A and B for a starter motor as shown in FIG. 1. While the material composition in the layer sections B of all the brushes is the same, the proportion of cleaning agent is significantly increased only in the layer section Aa of the fourth carbon brush 14a, in comparison to that in the layer sections A of the other carbon brushes 14.

Figure 5:
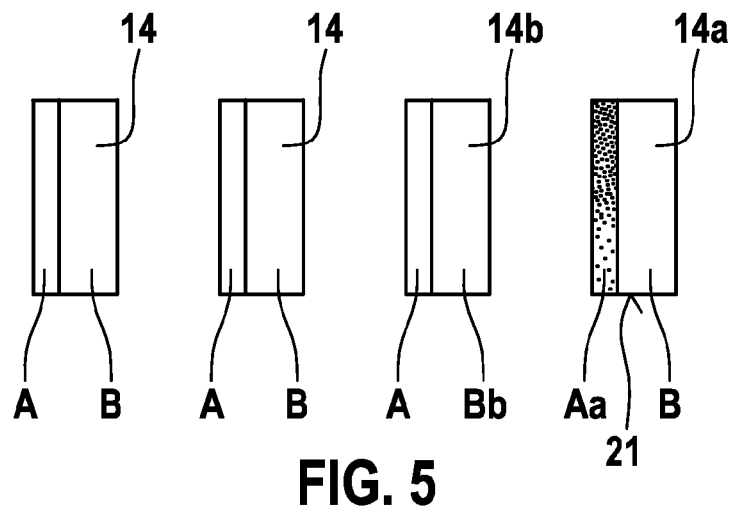
FIG. 5 shows four carbon brushes in a motor with a first additive in a first carbon brush, and a second additive in a second carbon brush.

Admittedly, all the carbon brushes in the exemplary embodiment shown in FIG. 5 are likewise provided with two layer sections A and B. However, there, only the two first carbon brushes 14 have the same material composition. In this case, in its first layer section Aa, the carbon brush 14a has an increased proportion of cleaning agent, and the carbon brush 14b has an increased proportion of lubricant in comparison to this only in the layer section Bb. Since the carbon brushes 14 become ever shorter as a result of wear as the life increases, their contact pressure on the commutator 13 decreases continuously, because of the long spring movement of the brush springs 15. In order to ensure adequate cleaning of the commutator running surface despite this, the proportion of cleaning agent in the layer section Aa on the carbon brush 14a increases from the running surface 21 of the carbon brush toward the connecting braid. Alternatively or simultaneously, it would also be possible, because of the decreasing contact force on the carbon brushes, to allow the lubricant in the layer section Bb of the carbon brush 14b to decrease from the running surface toward the connecting braid.

Figure 6:
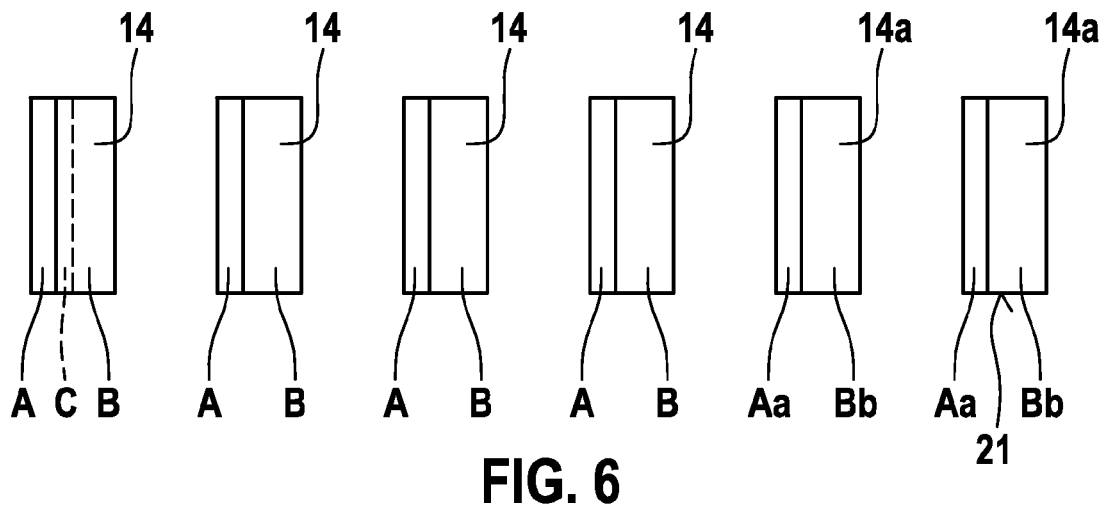
FIG. 6 shows an alternative embodiment for a motor with six carbon brushes.

In the six-pole starter motor 10 shown in FIG. 1, the positive and negative carbon brushes 14 are each offset through 60° with respect to one another. An angle of 120° therefore remains in each case between the two positive brushes and the two negative brushes. In the case of high-power six-pole machines, in contrast, six carbon brushes 14 are used, and are each offset through 60° with respect to one another. The solution according to the invention can also advantageously be used for this purpose. As a further exemplary embodiment, FIG. 6 shows the six carbon brushes of a machine such as this, each with two layer sections A and B. While four of these six carbon brushes 14 have the same material composition, the two remaining carbon brushes 14a have a different material composition. An increased proportion of cleaning agent is introduced into the layer section Aa of the two carbon brushes 14a, and an increased proportion of lubricant is introduced into the layer section Bb. The parameters of cleaning and sliding are in this case therefore finely adjusted via two carbon brushes 14a.

In principle, this solution can also be transferred to an electrical machine having four carbon brushes, which is particularly advantageous when the two positive carbon brushes have different commutation behaviors, which are dependent on the rotation direction, in comparison to the negative carbon brushes. In addition to fine adjustment, this in consequence also makes it possible to compensate for commutation differences. In a solution such as this, some 14a of the carbon brushes 14 are expediently provided with a higher proportion of one additive, and some others 14b of the carbon brushes 14 are expediently provided with a higher proportion of another additive.

Alternatively, the carbon brushes 14 can also be provided with a third layer section C, as is illustrated by dashed lines on the left-hand carbon brush 14 in FIG. 6. This layer C may contain further additives, or no additives whatsoever.

The invention is not restricted to the described exemplary embodiments. For example, it is possible to concentrate the respective additive in each case only in the selected carbon brushes 14a, 14b, or in one of their layer sections Aa, Bb, and to omit the additive in the other carbon brushes 14. It is likewise possible, in the case of brushes with a plurality of layer sections, to introduce an increased proportion of one additive into both layer sections Aa and Bb of the carbon brush 14a, in the selected carbon brushes 14a, 14b. It is also possible, in the case of carbon brushes with three layer sections, to dose the selected carbon brushes to a great extent with three different additives. In principle, instead of using a higher dosage, the proportion of one additive in the selected carbon brushes can also be significantly less than in the other carbon brushes. Because of the fact that contact force of the carbon brushes on the commutator decreases during its life, it is also possible within the scope of the invention not to introduce the respective additive over the entire height of the carbon brush, but only over a lower part of the height.

Normally, natural ash or aluminum oxide is used as the cleaning agent. Molybdenum disulfide, for example, is used as the lubricant. In addition, the invention can be used not only to achieve a longer life for motor-vehicle starter motors, but can be used just as well for commutator machines for other purposes.

The invention claimed is:

1. An electrical machine, comprising:
carbon brushes (14) in order to supply a current to a rotor, the carbon brushes (14) interacting with laminates (20) on a commutator (13), wherein the carbon brushes are provided all the way through the carbon brushes or in layer sections (A, B) that include copper and graphite with various additives (Aa, Bb), characterized in that at least one carbon brush (14a), but no more than half of a total number of all the carbon brushes (14) in the machine (10) have a proportion of additive (Aa; Bb) that is at least 10 percent higher than in the other carbon brushes (14).

2. The electrical machine as claimed in claim 1, characterized in that only one carbon brush (14a) in the machine (10) has a proportion of the additive (Aa) differing from the other carbon brushes (14).

3. The electrical machine as claimed in claim 1, characterized in that the different proportion of the additive is introduced only in a layer section (Aa; Bb) of the carbon brush (14a).

4. The electrical machine as claimed in claim 3, characterized in that the layer section (Aa) extends over the height and width of the carbon brush (14a) as far as a running surface (21) of the carbon brush.

5. The electrical machine as claimed in claim 1, characterized in that the additive is a cleaning agent for cleaning the commutator surface.

6. The electrical machine as claimed in claim 1, characterized in that the proportion of the additive changes from the running surface (21) of the carbon brush (14a) toward a connecting braid (18).

7. The electrical machine as claimed in claim 1, characterized in that some (14a) of the carbon brushes (14) have a higher proportion of one additive, and some others (14b) of the carbon brushes (14) have a higher proportion of another additive.

8. The electrical machine as claimed in claim 1, characterized in that, in the case of carbon brushes (14a, 14b) having a plurality of layer sections (A, B) in the running direction of the commutator, one additive is contained in one of the layer sections (Aa), and the other additive is contained in another layer section (Bb).

9. The electrical machine as claimed in claim 1, wherein the carbon brushes are provided all the way through or in layer sections (A, B) with various additives (Aa, Bb) such as cleaning agent, lubricant, means for increasing the resistance, or for increasing the electrical conductivity.

10. The electrical machine as claimed in claim 1, wherein less than half of all the carbon brushes (14) in the machine (10) have a proportion of additive (Aa; Bb) differing from the other carbon brushes (14).

11. The electrical machine as claimed in claim 1, characterized in that some (14a) of the carbon brushes (14) have a higher proportion of a cleaning agent, and some others (14b) of the carbon brushes (14) have a higher proportion of a lubricant.

12. An electrical machine, comprising: carbon brushes (14) in order to supply a current to a rotor, the carbon brushes (14) interacting with laminates (20) on a commutator (13), wherein the carbon brushes are provided all the way through the carbon brushes or in layer sections (A, B) that include copper and graphite with various additives (Aa, Bb), characterized in that at least one but no more than half of all the carbon brushes (14) in the machine (10) have a proportion of additive (Aa; Bb) differing from the other carbon brushes (14), characterized in that at least one of the carbon brushes (14b) in the machine (10) is provided with a proportion of a further additive differing from the other carbon brushes (14).

13. The electrical machine as claimed in claim 12, characterized in that the further additive is a lubricant.

14. An electrical machine, comprising: carbon brushes (14) in order to supply a current to a rotor, the carbon brushes (14) interacting with laminates (20) on a commutator (13), wherein the carbon brushes are provided all the way through the carbon brushes or in layer sections (A, B) with various additives (Aa, Bb), characterized in that at least one but no more than half of all the carbon brushes (14) in the machine (10) have a proportion of additive (Aa; Bb) differing from the other carbon brushes (14), characterized in that the proportion of the additive changes from a running surface (21) of the carbon brush (14a) toward a connecting braid (18) as a cleaning agent proportion increases and a lubricant proportion decreases.

15. An electrical machine, comprising: carbon brushes (14) in order to supply a current to a rotor, the carbon brushes (14) interacting with laminates (20) on a commutator (13), wherein the carbon brushes are provided all the way through the carbon brushes or in layer sections (A, B) that include copper and graphite with various additives (Aa, Bb), characterized in that at least one (14a) but no more than half of all the carbon brushes (14) in the machine (10) have a proportion of additive (Aa; Bb) that is at least 10 percent higher than in the other carbon brushes (14), and characterized in that the electrical machine is a six-pole machine with six of the carbon brushes (14).

16. The electrical machine as claimed in claim 15, characterized in that four of the six carbon brushes (14) have a first same material composition, and the other two of the carbon brushes (14) have a different material composition from the first material composition.

\* \* \* \* \*